F. K. VREELAND.
RECEIVER FOR HIGH FREQUENCY ELECTRICAL OSCILLATIONS.
APPLICATION FILED JULY 25, 1905.
930,508.
Patented Aug. 10, 1909.
2 SHEETS—SHEET 1.
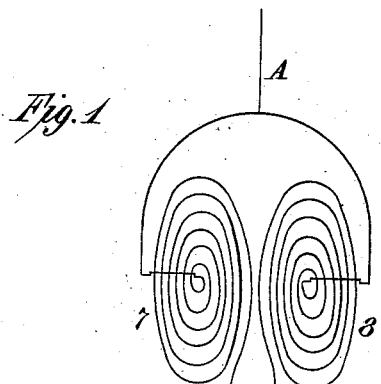
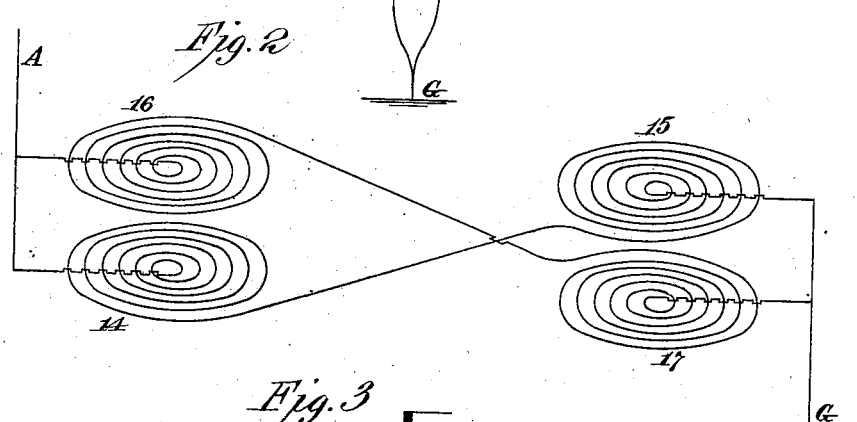
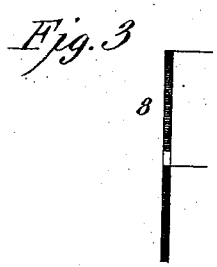
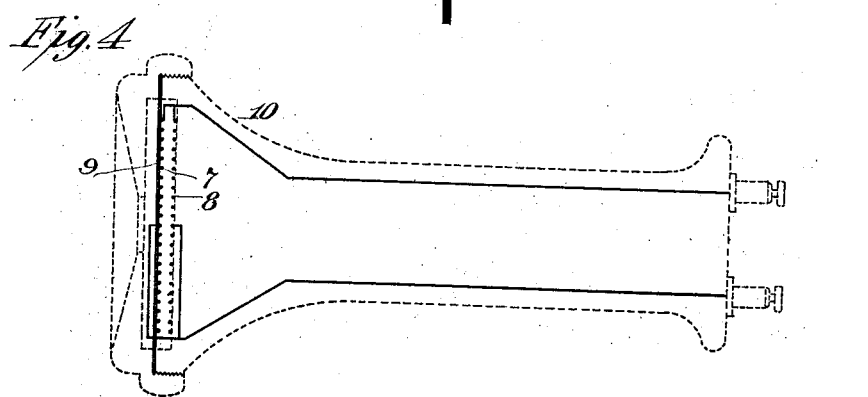
Witnesses:
Inventor
Fredrick K. Vreeland
By Dyer & Dyer
Attorneys.

F. K. VREELAND.
RECEIVER FOR HIGH FREQUENCY ELECTRICAL OSCILLATIONS.
APPLICATION FILED JULY 25, 1905.
930,508.
Patented Aug. 10, 1909.
2 SHEETS—SHEET 2.
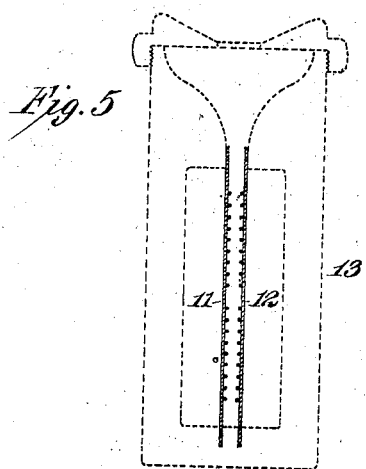
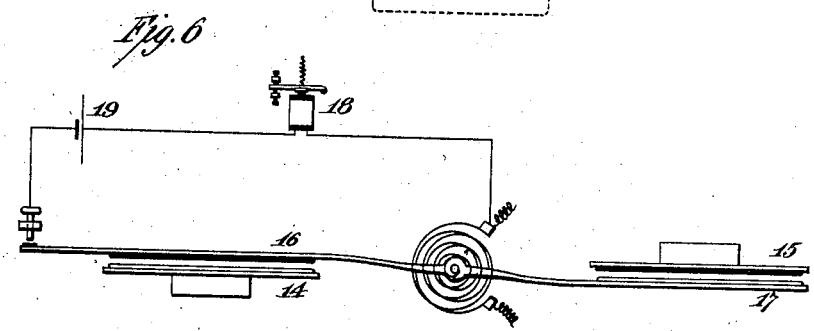
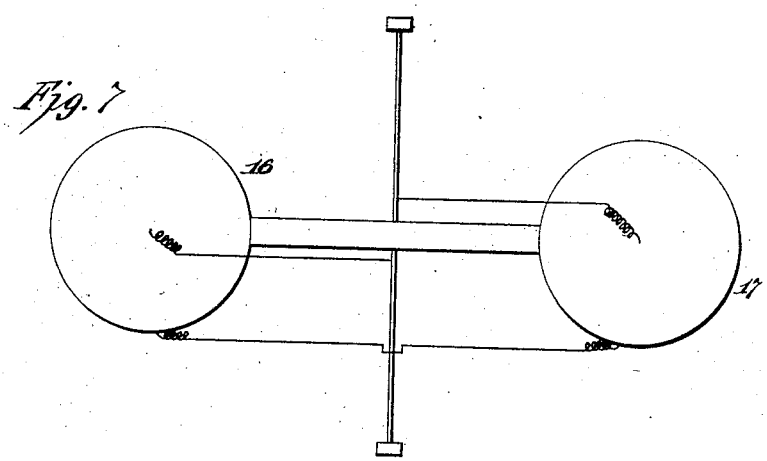
Witnesses:
Inventor
Frederick K. Vreeland
By Dyer & Dyer
Attorneys.

UNITED STATES PATENT OFFICE.

FREDERICK K. VREELAND, OF MONTCLAIR, NEW JERSEY, ASSIGNOR TO WIRELESS TELEGRAPH EXPLOITATION COMPANY, OF NEW YORK, N. Y. A CORPORATION OF NEW YORK.

RECEIVER FOR HIGH-FREQUENCY ELECTRICAL OSCILLATIONS.

No. 930,508.　　　　Specification of Letters Patent.　　　Patented Aug. 10, 1909.

Application filed July 25, 1905. Serial No. 271,203.

*To all whom it may concern:*

Be it known that I, FREDERICK K. VREELAND, a citizen of the United States, residing at Montclair, in the county of Essex and State of New Jersey, have invented a certain new and useful Improvement in Receivers for High-Frequency Electrical Oscillations, of which the following is a description.

The object of this device is to utilize the energy of high frequency alternating currents directly, without the use of any intermediate translating device, to produce mechanical movement, but particularly to utilize the high frequency currents which are set up in a wireless telegraph receiving apparatus to produce an audible signal or to operate a relay or other receiving apparatus involving mechanical movement. This result is accomplished by means of two coils wound in close inductive relation, so that their mutual induction is nearly as great as the self-induction of each, and traversed by the rapidly alternating signal impulses in opposite directions, so that their respective magnetic fields are mutually opposed, and the mutual induction of the two coils practically neutralizes their self-induction. The coils are connected in parallel in the receiver circuit, and the mechanical action between them will be a force of repulsion. This force may be utilized to produce an audible signal by mounting one or each of the coils on an elastic diaphragm of insulating material, such as thin glass, and mounting this diaphragm, after the fashion of an ordinary telephone receiver, in the capsule which is applied to the ear; or one coil may be fixed and the other movable about an axis, the movable coil being caused to open and close a pair of contacts and thus operate a telegraph sounder or other receiving device; or two movable coils may be mounted on the same axis, and a pair of similar fixed coils be arranged one opposite each of the movable coils. In winding the coils I prefer to wind them spirally in disk form. In this form the coils may be placed face to face and close together so that they shall have a large mutual induction. It is desirable that the two coils be geometrically similar, *i. e.* that each turn of one coil shall be placed close to a similar turn of the other coil, so that the self-induction not only of the whole coils, but of each individual turn of these coils, shall be directly neutralized by the mutual induction, thus doing away with the reflections and other disturbing effects which occur when a high frequency current encounters an unbalanced inductance. To secure for a given space the maximum number of turns and maximum conductivity in a single layer of the conductor, I prefer to make each coil of a thin metallic ribbon suitably insulated and wound spirally flatwise upon itself, the width of the ribbon constituting the thickness of the coil.

In the drawing, Figure 1 is a diagram showing an arrangement of two opposed coils; Fig. 2 is a diagram showing an arrangement of four coils; Fig. 3 is a cross-section of one of the coils made of an insulated metallic ribbon; Fig. 4 is a sectional view of a receiver, showing a movable and fixed coil mounted in a telephone-receiver capsule, the movable coil being carried by a diaphragm; Fig. 5 is a sectional view of a receiver wherein both coils are mounted upon diaphragms; Fig. 6 is a plan view showing four coils, two movable and two fixed, the movable coils being carried by a frame carried by oppositely strained spiral springs: and Fig. 7 is an elevation showing the frame carrying the two movable coils suspended by torsion wires.

In Fig. 1 the two spirally wound coils 7, 8 are wound in opposite directions and connected in parallel, the center turn of each coil being shown connected to the receiving antenna A, and the outer turn of each coil to the ground plate G. I prefer that each coil should be made of an insulated metallic ribbon wound spirally flatwise upon itself, as shown in Fig. 3. One of these coils may be mounted on a telephone diaphragm 9 of glass or other elastic insulating material, and the other be fixed on the body of a telephone-receiver capsule 10, as shown in Fig. 4; or both coils may be mounted on similar diaphragms 11, 12 in a suitable case 13, inclosing between them an air space opening into an ear piece, as shown in Fig. 5.

Fig. 2 shows two sets of coils arranged to form a relay, the two fixed coils 14, 15 being connected in series, and the two movable coils 16, 17 being also connected in series, and the two pairs of coils being connected in parallel between the antenna and ground. It is desirable to have the current enter the system through the middle turns of one pair of coils 14, 16, and leave through the middle turns of the second pair 15, 17. The movable coils may be mounted by a suspension of any one of several well known types, for example through a pair of mutually opposed spiral springs which serve to carry the current into and out of the movable coils, as shown in Fig. 6, or by a double suspension of torsion wires which serve a similar purpose, as in Fig. 7. In Fig. 6 the local circuit is shown including the sounder 18 and local battery 19.

Although a receiver of this type may be used in connection with a spark transmitter of the ordinary well known form, which gives off strongly damped wave trains of short duration separated by long intervals of inactivity, it is much more effective and is particularly intended for use in connection with a transmitter which produces undamped or at least long-sustained oscillations, such as is set forth in my application for Letters Patent filed February 28, 1905, Serial No. 247826 (Patent No. 829447 dated August 28, 1906), in which case the receiving circuit in which the receiver is placed or with which it is connected, which receiving circuit is preferably a tuned circuit, carries signal impulses composed of undamped or sustained high frequency electrical oscillations. The advantage of a persistent signal of this character arises from the fact that a receiver of the form herein described is cumulative in its action, and a very considerable time, compared to the frequency of the oscillations, is required to set the movable coil in motion, however lightly this coil may be constructed. A receiver of this type, used in connection with a transmitter emitting undamped radiations, is capable of accumulating enough energy from a prolonged signal impulse to produce a noticeable effect even though the intensity of the radiations be very small. It is possible to operate a system of this character by signals which would not affect a receiver of the ordinary well known type whose indications depend upon the intensity of the signal impulses rather than on the total energy.

Although my receiver is shown as connected between the antenna and ground, it is obvious that it may be used in any receiving circuit carrying an alternating current.

My receiver is particularly suitable for use in connection with a tuned receiving circuit of any one of the well known forms for syntonic signaling, although it may be used in a simple responsive system. On account of its low resistance and low effective inductance, the receiver is well suited for use in connection with the current multiplier described at page 200 of my book published in 1904 on "Maxwell's theory and wireless telegraphy".

What I claim is:

1. A receiver for high frequency signal impulses wherein are combined two relatively movable coils arranged in close inductive relation with their magnetic fields mutually opposed, such coils being connected in parallel, substantially as set forth.

2. A receiver for high frequency signal impulses wherein are combined two relatively movable and geometrically similar coils arranged in close inductive relation with their magnetic fields mutually opposed, such coils being connected in parallel, substantially as set forth.

This specification signed and witnessed this 17th day of July, 1905.

FREDERICK K. VREELAND.

Witnesses:
 JNO. ROBT. TAYLOR,
 JOHN S. LOTSCH.